July 1, 1941.  C. E. FREDERICKSON  2,247,610
BRAKE MECHANISM
Filed Oct. 17, 1939   2 Sheets-Sheet 1
Fig.1.
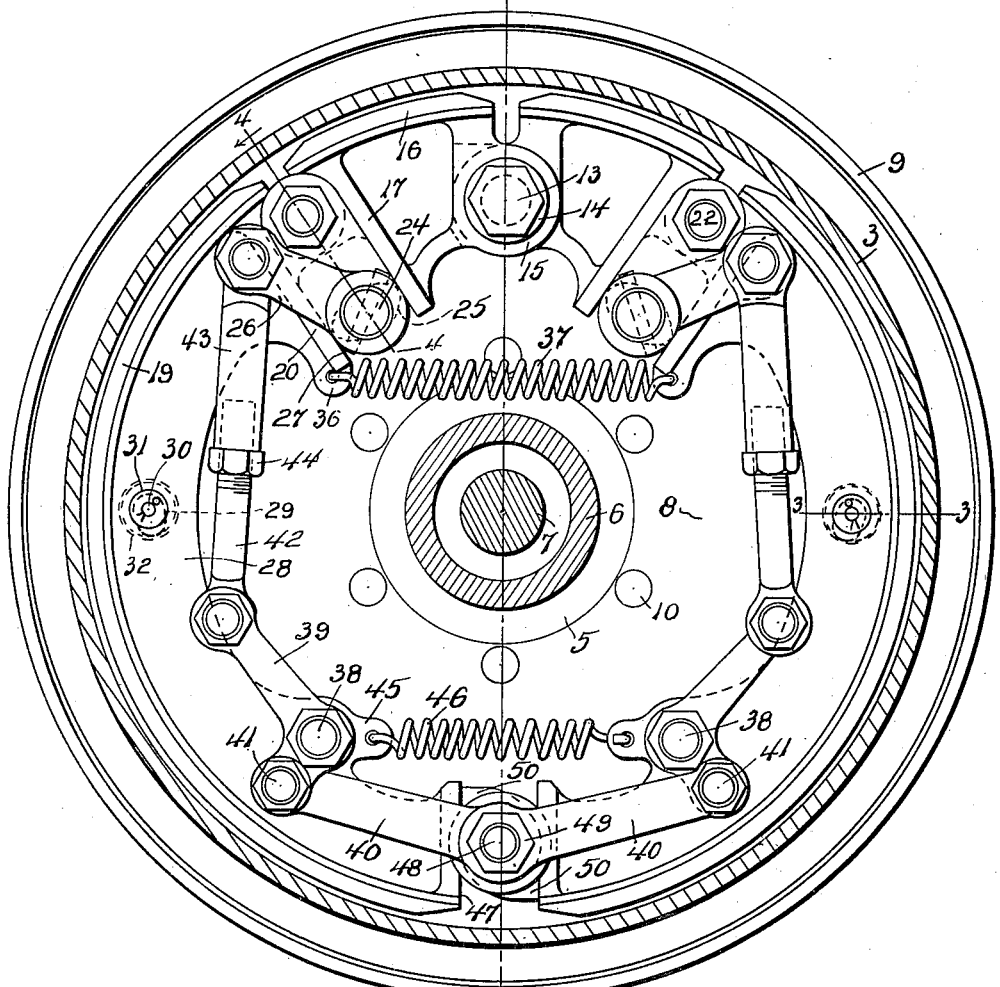
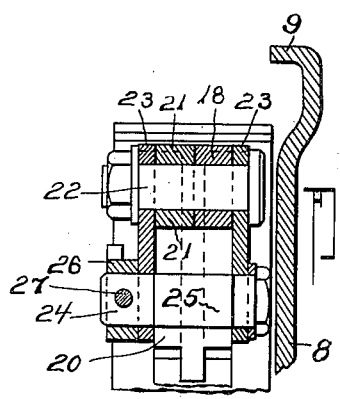
Fig.4.
Inventor
Clayton E. Frederickson
By Dieterich & Rutley
Attorneys

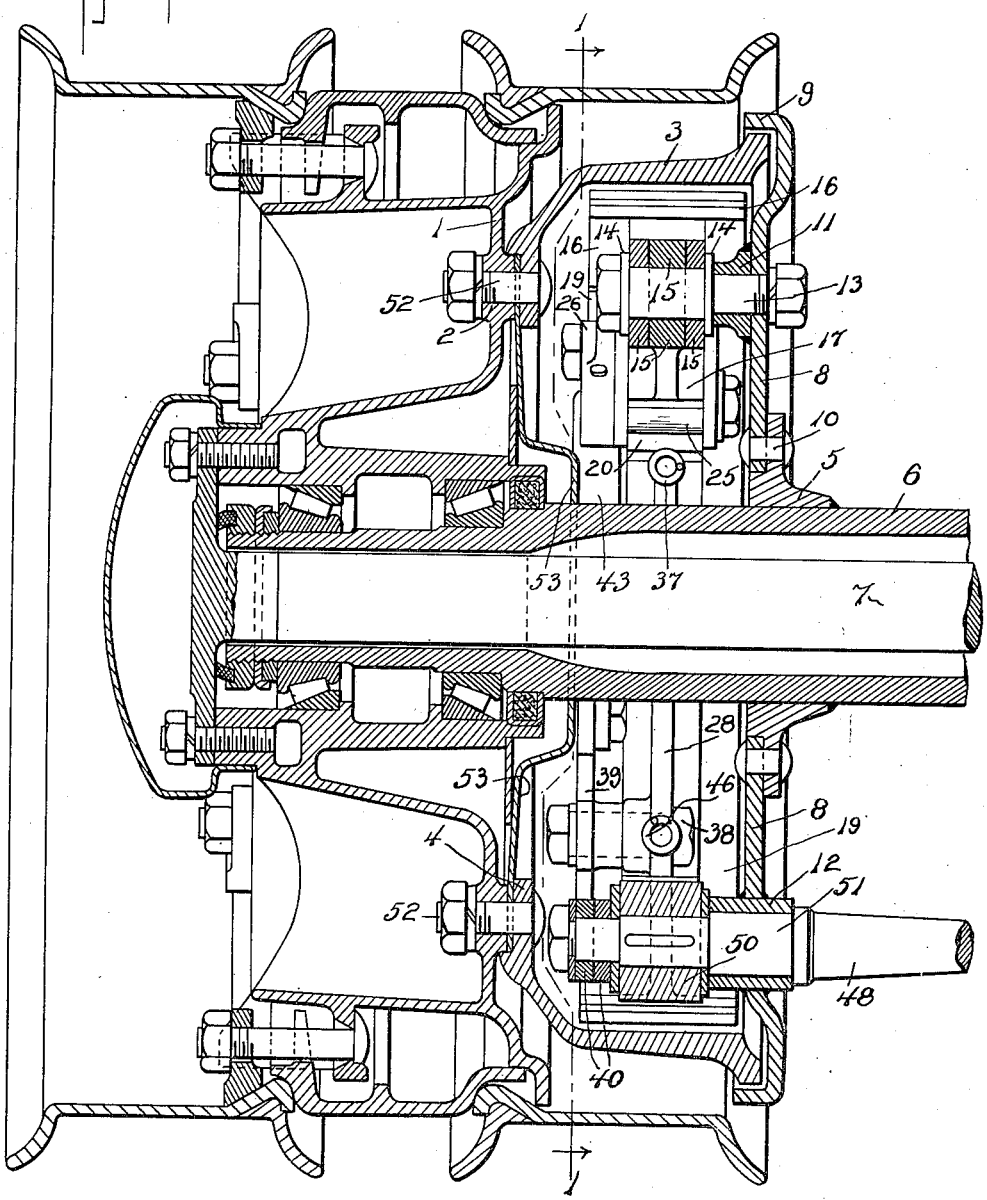
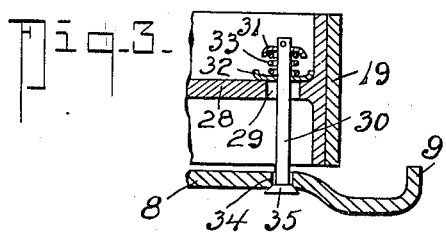

Patented July 1, 1941

2,247,610

UNITED STATES PATENT OFFICE 2,247,610

BRAKE MECHANISM

Clayton Erasmus Frederickson, Chicago, Ill.

Application October 17, 1939, Serial No. 299,889

14 Claims. (Cl. 188—78)

My invention relates to motor vehicle brakes, and it has been designed for heavy duty service, and especially designed for use with dual tire wheels.

Primarily, the invention has for its object to provide a brake the heel portions of whose shoes will engage the brake-drum first and then the remainder of the braking surfaces of the shoes from heel to toe are brought into engagement, thus preventing brake grab and ensuring a more even wear on the shoes.

Further, it is an object to provide a brake which, with but little effort by the operator, will exert a strong braking force on the drum.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a section on the line 1—1 of Fig. 2.

Fig. 2 is a section on the line 2—2 of Fig. 1.

Fig. 3 is a detail section on the line 3—3 of Fig. 1.

Fig. 4 is a detail section on the line 4—4 of Fig. 1.

In the drawings, in which like numerals of reference indicate like parts in all the figures, 1 is the web of a dual wheel. The web 1 has apertured bosses 2 to receive the bolts 52 which secure the web 4 of the brake-drum 3 to the wheel's web.

Secured to the axle housing 6 is a flange member 5 (welded or otherwise rigidly fastened), to which the brake mounting-plate 8 is riveted, as at 10, the plate 8 having a flange 9 to overlie the drum 3 as shown and thus serve as a cap or closure for the brake chamber. The shaft 7 which drives the wheel and drum is of the usual type.

An apertured lug 11 is welded or otherwise permanently secured to plate 8 and carries the stud bolt 13 on which the brake shoes are pivotally mounted.

A bearing 12 is also carried by plate 8 for the operating shaft 48 whose bearing portion 51 turns in bearing 12.

Each brake shoe comprises two sections or members: a short section 16 and a long section 19. These sections are hinged together by bolts 22 passing through their ears 18 and 21.

The short sections 16 have ears 15 pivoted on the stud bolt 13 between washers 14, the bolt 13 constituting the main pivot of the system. At the adjacent ends of the sections 16-19 respectively, they are provided with flat end faces 17 and 20 respectively, between which an oval or egg-shaped cam 25, on a pin 24, lies.

The pin 24 is carried in a pair of links 23 which are pivoted on hinge pins or bolts 22 and to which the lever arms 26 are pinned as at 27. Each shoe 19 has its web 28 apertured as at 29. Pins 30 having heads 35 pass through holes 34 in the plate 8 and through the holes 29 and carry washers 31 and 32 between which springs 33 are located for the purpose of holding the shoe sections 19 in position (see Fig. 3).

Each web 28 has an ear 45 adjacent the toe end and an ear 36 adjacent the heel end. The ears 36 of opposite shoes 19 are connected by a coil spring 37 while the ears 45 are similarly connected by a spring 46.

The spring 46 serves to hold the flat faces 47 of the shoe sections 19 against the main operating cam 50 at all times.

Pivoted to stud bolts 38, secured to the web 28, are bell-crank levers 39 the short ends of which are connected to the shaft 48 by connecting rods 40, the rods being hinged to the levers 39 as at 41 and held in place by a nut 49.

The respective levers 26 are connected with their respective bell-cranks 39 by adjustable connecting rods each composed of a socket member 43 and a rod member 42 threaded together and secured by jam nut 44.

The brake-drum (unless it is formed as a solid web cup) has its center web opening closed by a plate 53 secured by the bolts 52.

Operation

Assume the parts are in the normal "brake-off" position, as shown in Figs. 1 and 2. Now as power is applied to turn shaft 48, cam 50 will begin to spread the toe end faces 47 apart. This action at once causes the centers of bolts 38 to move apart against the tension of spring 46. This causes the bell-cranks to move on 41 as a pivot, thereby pulling down on connecting rods 42-43 and consequently down on lever arms 26 which in turn causes cams 25 to turn to permit spring 37 to pull end faces 17-20 toward one another.

As pivots 22 lie at greater distances from the center of shaft 7 than does pivot 13, further movement of cam 50, in applying the brake, will cause the heels of the shoes to contact the brake-drum first, instead of the toes doing so, as has heretofore been common practice.

Further action of cam 50 serves to bring a longer amount of the shoe face into braking engagement with the drum.

On release of shaft 48 the springs 37 and 46 return the parts to normal.

From the foregoing description, taken in connection with the accompanying drawings, it is thought that the complete construction, operation and advantages of the invention will be clear to those skilled in the art.

What I claim is:

1. In a wheel brake, a rotatable drum, a non-rotatable brake mounting plate, a pair of articulated brake shoes each comprising a long section and a short section hingedly joined together, the short sections having their outer ends pivoted at one end of each to said plate, spring means for holding said shoes in brake-off position, combined with means for applying the short sections of said shoes to the drum first and then applying the remainder of the braking surfaces of the shoes to the drum.

2. In a wheel brake, a rotatable drum, a non-rotatable brake mounting plate, a pair of articulated brake shoes each comprising a long section and a short section hingedly joined together, the short sections having their outer ends pivoted at one end of each to said plate, spring means for holding said shoes in brake-off position, combined with means for applying the short sections of said shoes to the drum first and then applying the remainder of the braking surfaces of the shoes to the drum, said shoe applying means comprising a system of cams, levers and connecting rods cooperative with said shoes and including a main operating cam shaft.

3. In a wheel brake, a rotatable drum, a non-rotatable brake mounting plate, a pair of articulated brake shoes pivoted at one end of each to said plate, spring means for holding said shoes in brake-off position, combined with means for applying the heel portions of said shoes to the drum first and then applying the remainder of the braking surfaces of the shoes to the drum, each brake shoe comprising a long section and a short section, a hinge connection between the sections, the short sections being pivoted to the plate, said main cam being mounted on the plate, an auxiliary cam for each shoe for effecting articulation between the long and short sections, and a system of levers and links carried by the shoes and cooperating with said cams for first effecting articulation to cause the heels of the shoes to contact the brake-drum and upon further movement applying the remainder of the braking surfaces of the shoes from heel to toe to the drum.

4. In a wheel brake, a rotatable drum, a non-rotatable brake mounting plate, a pair of articulated brake shoes pivoted at one end of each to said plate, spring means for holding said shoes in brake-off position, combined with means for applying the heel portions of said shoes to the drum first and then applying the remainder of the braking surfaces of the shoes to the drum, each brake shoe comprising a long section and a short section, a hinge connection between the sections, the short sections being pivoted to the plate, said main cam being mounted on the plate, an auxiliary cam for each shoe for effecting articulation between the long and short sections, and a system of levers and links carried by the shoes and cooperating with said cams for first effecting articulation to cause the heels of the shoes to contact the brake-drum and upon further movement applying the remainder of the braking surfaces of the shoes from heel to toe to the drum, said system of levers and links and said cams operating in opposition to said springs.

5. In a wheel brake, a rotatable brake-drum and a fixed brake mounting plate cooperating therewith, a pair of articulated brake shoes, a pivot stud on said plate to which one end of each shoe is pivoted, the toe ends of said shoes being spaced apart, a main operating cam shaft journaled in a bearing carried by said plate and having its cam located between said toe ends, a spring connecting the shoes together adjacent their toe ends to maintain contact with said operating cam, each brake shoe comprising a short section and a long section hinged together, the short sections being pivoted on said stud, an auxiliary cam cooperating with and between each long and short section, a spring connecting the long sections of the two shoes together to maintain contact between said auxiliary cams and the respective long and short sections and normally hold the sections with the braking surfaces in general alignment, and means cooperating with said cams and shoes and operating upon the action of said main cam to cause articulation to occur to bow the joints outwardly and apply the heels of the shoes to the drum in advance of the remainder of the braking surfaces.

6. In a wheel brake, a rotatable brake-drum and a fixed brake mounting plate cooperating therewith, a pair of articulated brake shoes, a pivot stud on said plate to which one end of each shoe is pivoted, the toe ends of said shoes being spaced apart, a main operating cam shaft journaled in a bearing carried by said plate and having its cam located between said toe ends, a spring connecting the shoes together adjacent their toe ends to maintain contact with said operating cam, each brake shoe comprising a short section and a long section hinged together, the short sections being pivoted on said stud, an auxiliary cam cooperating with and between each long and short section, a spring connecting the long sections of the two shoes together to maintain contact between said auxiliary cams and the respective long and short sections and normally hold the sections with the braking surfaces in general alignment, and means cooperating with said cams and shoes and operating upon the action of said main cam to cause articulation to occur to bow the joints outwardly and apply the heels of the shoes to the drum in advance of the remainder of the braking surfaces, said last named means comprising links carried by the shoes and supporting the auxiliary cams, lever arms on said auxiliary cams, bell-cranks on said shoes, connecting rods connecting one arm of each bell-crank to a fixed pivot, and connecting rods between the other arms of said bell-cranks and said lever arms.

7. In a wheel brake, a rotatable brake-drum and a fixed brake mounting plate cooperating therewith, a pair of articulated brake shoes, a pivot stud on said plate to which one end of each shoe is pivoted, the toe ends of said shoes being spaced apart, a main operating cam shaft journaled in a bearing carried by said plate and having its cam located between said toe ends, a spring connecting the shoes together adjacent their toe ends to maintain contact with said operating cam, each brake shoe comprising a short section and a long section hinged together, the short sections being pivoted on said stud, an auxiliary cam cooperating with and between each long and short section, a spring connecting the long sections of the two shoes together to maintain contact between said auxiliary cams and the respective long and short sections and normally hold the sections with the braking surfaces in general alignment, and means cooperating with said cams and shoes and operating upon the action of said main cam to cause articulation to occur to bow the joints outwardly and apply the heels of the shoes to the drum in advance of the remainder of the braking surfaces, said last named means comprising links carried by the shoes and supporting the auxiliary cams, lever arms on said auxiliary cams, bell-cranks on said shoes, connecting rods connecting one arm of each bell-crank to a fixed pivot, and connecting rods between the other arms of said bell-cranks and said lever arms, said last named connecting rods each comprising two sections with means by which they may be lengthened or shortened for purposes of adjustment.

8. In a wheel brake, a rotatable drum, a non-rotatable brake mounting plate, a pair of articulated brake shoes comprising a long and a short section, means pivoting the ends of the short sections to said plate, spring means for holding said shoes in brake-off position, combined with a stationarily located main cam operative between the free ends of said shoes, and a system of auxiliary cams and levers cooperatively connected with the main cam for first effecting an application of the heel portions of the shoes to the drum and thereafter applying the remainder of the braking surfaces of the shoes to the drum.

9. In a wheel brake, a rotatable drum, a non-rotatable brake mounting plate, a pair of articulated brake shoes comprising a long and a short section, means pivoting the ends of the short sections to said plate, spring means for holding said shoes in brake-off position, combined with a main cam operative between the free ends of said shoes, said shoes at the articulations having opposed cam engaging elements, auxiliary cams between said elements, and a system of levers and links connecting said main cam with said auxiliary cams and with said shoes by virtue of which upon initial movement of the main cam the heels of the shoes will first be applied to the drum and on further movement of the main cam the remainder of the braking surfaces of the shoes will be applied to the drum.

10. In a wheel brake, a rotatable drum, a non-rotatable brake mounting plate, a pair of articulated brake shoes pivoted at one end of each to said plate, and spring means for holding said shoes in brake-off position, combined with means for applying the heel portions of said shoes to the drum first and then applying the remainder of the braking surfaces of the shoes to the drum, said last named means including an operating cam whose axis is stationarily located, and operative connections between said cam and said shoes.

11. In a wheel brake, a rotatable drum, a non-rotatable brake mounting plate, a pair of articulated brake shoes pivoted at one end of each to said plate, and spring means for holding said shoes in brake-off position, combined with means for applying the heel portions of said shoes to the drum first and then applying the remainder of the braking surfaces of the shoes to the drum, said shoe applying means comprising a system of cams whose axes are stationarily located, and levers and connecting rods cooperative with said shoes and including a main operating cam shaft.

12. In a wheel brake, a rotatable drum, a non-rotatable brake mounting plate, a pair of brake shoes each comprising a short section and a long section hingedly joined together, the short sections being pivoted at their outer or free ends to said mounting plate, a cam for spreading apart the free ends of said long sections, a spring connecting said long sections and acting in opposition to said spreading cam, other cams cooperating with the hinge joints aforesaid for effecting articulation in one direction and spring means opposing action of said other cams, and levers and links connecting said spreading cam with said other cams for effecting the action thereof in the application of the brakes.

13. In a wheel brake, a rotatable drum, a non-rotatable brake mounting plate, a pair of brake shoes each comprising a short section and a long section hingedly connected together, means pivoting the outer or free ends of the short sections to said mounting plate, a cam for spreading the free ends of said long sections apart, a spring connecting said long sections together and acting in opposition to said cam, and means cooperating with said cam and with the adjacent parts of the long and short shoe sections at their joints for moving said shoe sections on their hinged joints, by virtue of all of which upon moving the cam to separate the shoes, the heels of the short sections will be first applied to the drum and upon further movement of the cam, the remainder of the short sections and the long sections will be brought into engagement with the drum.

14. In a wheel brake, a rotatable drum, a non-rotatable brake mounting plate, a pair of brake shoes each comprising a short section and a long section hingedly connected together, means pivoting the outer or free ends of the short sections to said mounting plate, a cam for spreading the free ends of said long sections apart, a spring connecting said long sections together and acting in opposition to said cam, and means cooperating with said cam and with the adjacent parts of the long and short shoe sections at their joints for moving said shoe sections on their hinged joints, by virtue of all of which upon moving the cam to separate the shoes, the heels of the short sections will be first applied to the drum and upon further movement of the cam, the remainder of the short sections and the long sections will be brought into engagement with the drum, said last named means comprising other cams engaging the long and short shoe sections at their articulated joints to move the shoe sections in one direction and a spring continuously tending to oppose such movement and reverse the same.

CLAYTON ERASMUS FREDERICKSON.